UNITED STATES PATENT OFFICE.

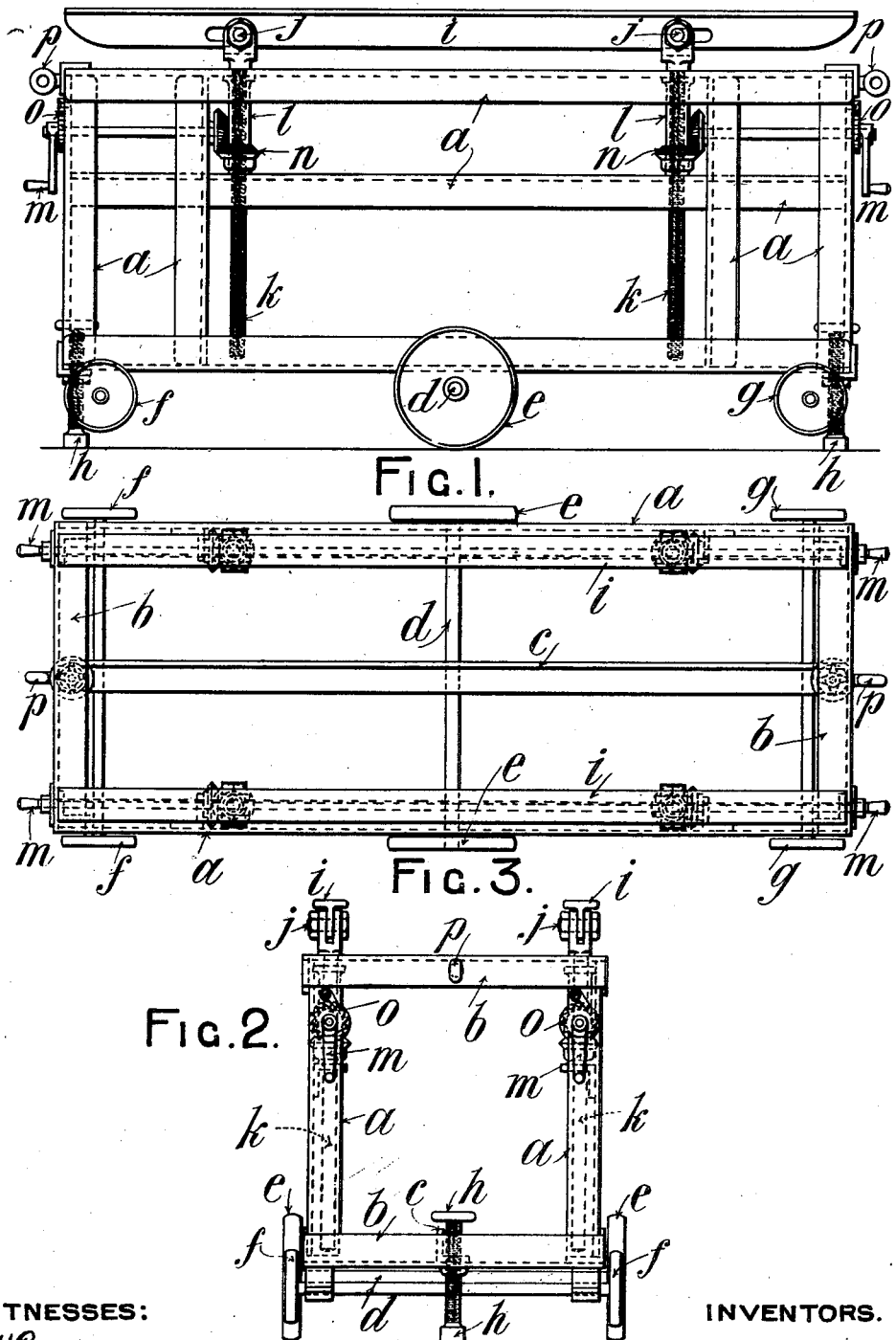

BERTIE TRICKEY AND WILLIAM THOMAS CAIN, OF LONDON, ENGLAND, ASSIGNORS TO "ELEJUSTOR" LIMITED, OF LONDON, ENGLAND, A COMPANY.

TRUCK OR CARRIAGE FOR USE IN SHIP-BUILDING.

934,949.  Specification of Letters Patent. Patented Sept. 21, 1909.

Application filed May 8, 1908. Serial No. 431,721.

*To all whom it may concern:*

Be it known that we, BERTIE TRICKEY and WILLIAM THOMAS CAIN, subjects of the King of Great Britain and Ireland, residing at 17 Nairn street and 27 Nairn street, respectively, Poplar, London, England, have invented a new and useful Improved Truck or Carriage for Use in Ship-Building, of which the following is a specification.

The present invention relates to an improved truck or carriage for use in shipbuilding and comprises an improved wheeled truck or carriage for easily and rapidly transporting and handling ships' bottom plates and holding them in position for riveting.

In the accompanying drawing, Figure 1 is a view in side elevation of a truck or carriage constructed according to the present invention, and Figs. 2 and 3 are views in end elevation and plan respectively.

Throughout the views similar parts are marked with like letters of reference.

According to the present invention, a truck or carriage is formed of a plurality of members suitably braced or connected together to form a rectangular box-like frame or structure, composed essentially of members $a$ forming the two sides connected together at each end by transverse members $b$ and one or more bottom members $c$. On the bottom of the frame—at about the center of its length—is provided a transverse axle $d$ carrying a pair of wheels $e$ one on either side of the carriage so as to allow of the carriage being readily slued around. A pair of wheels $f$ and $g$ fore and aft of the carriage are also provided and are of such a diameter or so arranged that the carriage runs either on the fore wheels $f$ and the center wheels $e$ or on the aft wheels $g$ and the center wheels $e$ or on the center wheels $e$ alone, and means, such as screw jacks $h$, are provided for chocking up either the fore or aft ends or both (as shown) of the carriage when required.

On the top members of the side frames of the carriage are horizontally carried longitudinal balks or members $i$ each of which is pivoted or jointed at $j$ to a rod or shaft $k$ carried so as to be capable of vertical movement in bearings on the side frames. Each of the said rods or shafts is arranged to be moved vertically and independently, preferably by screw-threading them as shown and providing threaded sleeves or nuts $l$ thereon working between suitable bearings or abutments on the frame. The said sleeves or nuts $l$ may be adapted to be rotated by hand wheels carried thereon but are preferably rotated by a crank handle $m$ and spur or bevel gearing $n$. A ratchet wheel and pawl device $o$ may be provided to control the rotation of the crank-handle $m$.

The plate to be transported and held in position for riveting is placed flat on top of said horizontal members $i$ and when in position beneath the ship or framing thereof is raised by means of the vertical shafts $k$ into the desired position. By pivoting or hinging the top horizontal members $i$ to the vertical rods or shafts $k$ and making each of said rods $k$ independently adjustable the said members $i$ can be readily adjusted to suit the bevel shape or curvature of the plate, while transporting it as well as holding it up in its proper position for riveting.

The top horizontal members $i$ may be provided with adjustable or removable transverse struts or braces for connecting them together and they may in some cases be furnished with adjustable and removable clamps for holding the plate during transport.

Within or on the members of the frame forming the truck or carriage may be mounted one or more motors for operating drilling machines or other tools. Provision may also be made for carrying drilling machines or frames on the top horizontal members.

Chains or slings to enable the entire carriage or truck to be hoisted or lowered by means of a crane are provided and so arranged as to drop clear—when not in use—out of the way of the top horizontal members and the mechanism operating them, or the top members of the end frames $b$ may carry eyes $p$ for a hoisting or slinging chain. The top horizontal members $i$ may be raised and lowered electrically or hydraulically or by means of steam, air, or other fluid pressure, the mechanism being preferably arranged to allow of each end of each of the members being operated independently.

What we claim as our invention, and desire to secure by Letters Patent is:—

A truck or carriage for use in shipbuilding comprising a plurality of members suitably braced together to form a box-like structure, horizontal members carried on said structure adapted to receive and support the plate to be carried and held in position for riveting, means carried on said structure for raising and lowering any one end of each of said horizontal members independently of its other end, independently rotatable wheels carried medially one on either side of said carriage, a pair of wheels fore and a pair of wheels aft of said carriage carried by a fixed axle and of such a diameter with respect to the medial wheels or so arranged as to prevent the wheels of one pair contacting with the ground at the same time as the wheels of the other pair, and screw jacks provided both on the fore and aft ends of said carriage for the purpose of chocking up either end of said carriage, as set forth.

In testimony whereof we have hereunder signed our names in the presence of subscribing witnesses.

BERTIE TRICKEY.
WILLIAM THOMAS CAIN.

Witnesses:
JAMES WILLIAM PARKES,
A. MILLWARD HACK.